May 12, 1942.  E. M. GODFREY, JR  2,283,005
TIRE TREAD REMOVING MACHINE
Filed Jan. 30, 1939  2 Sheets-Sheet 1
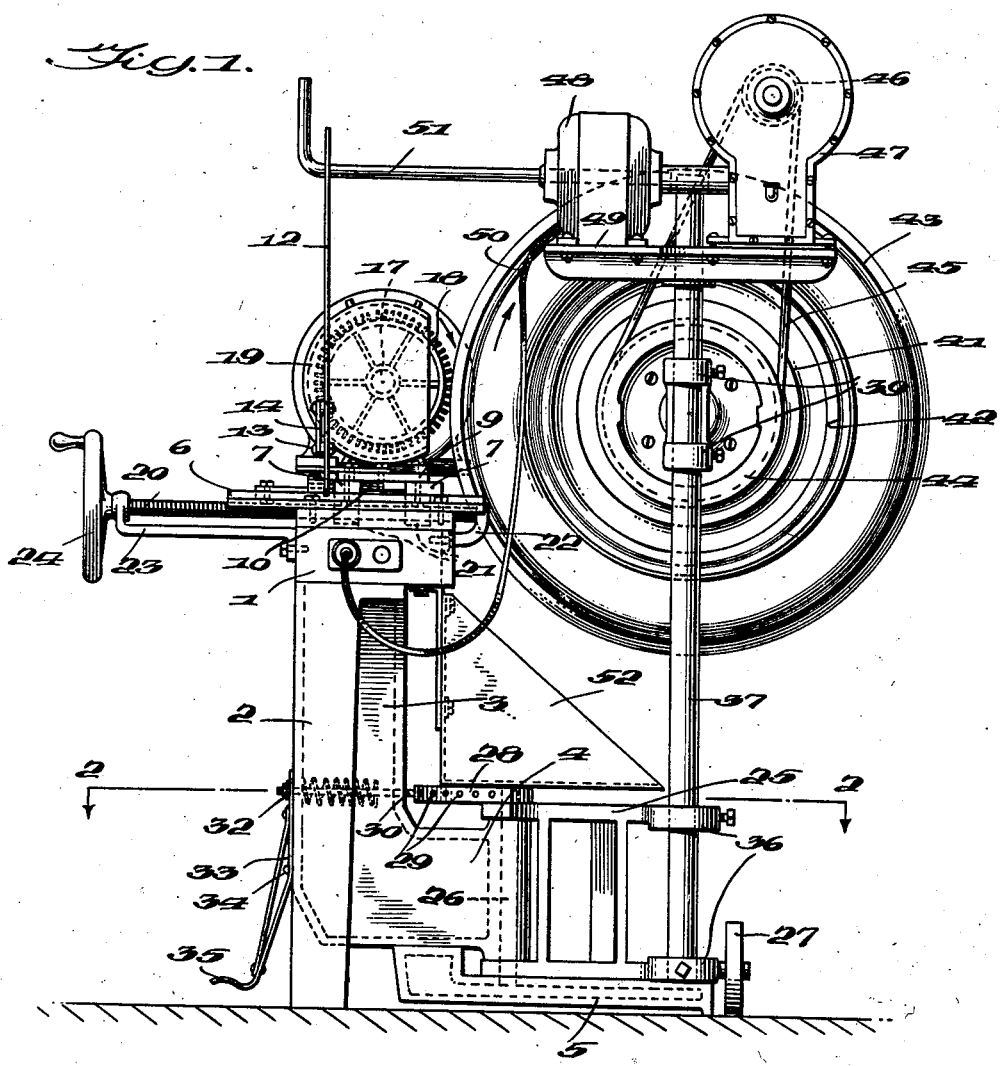

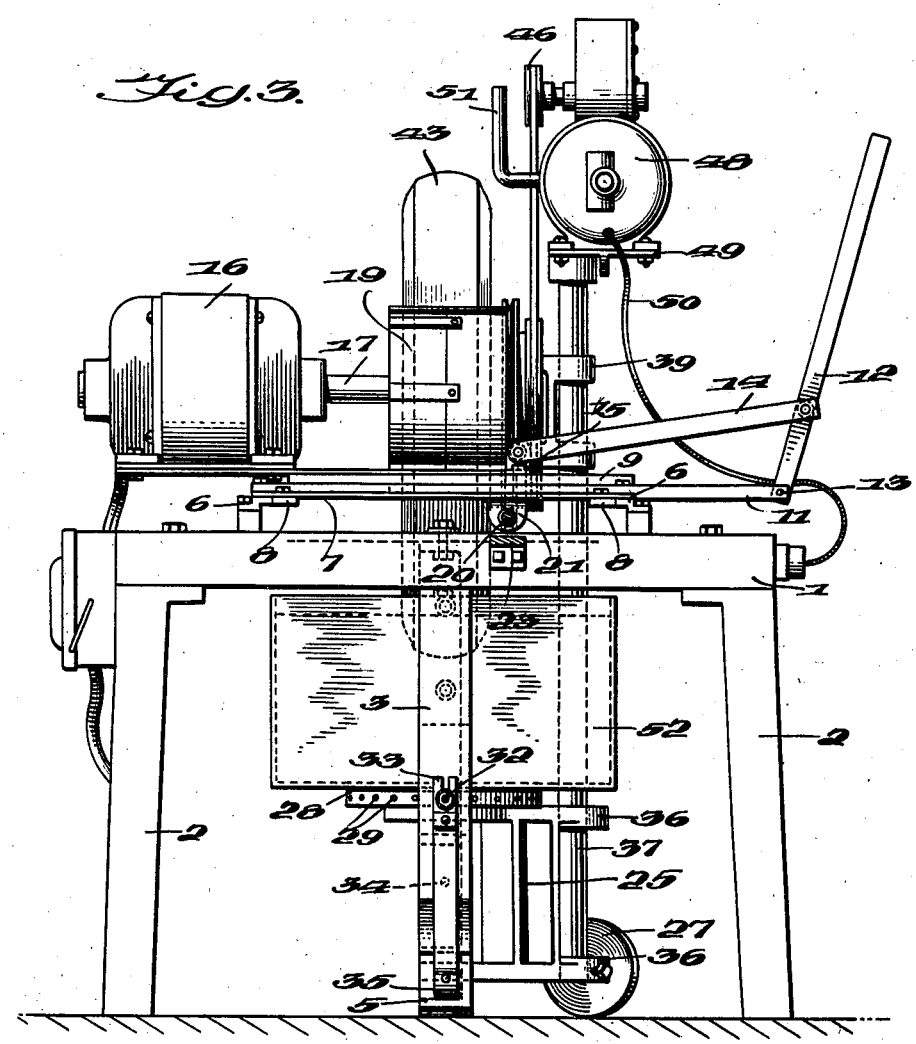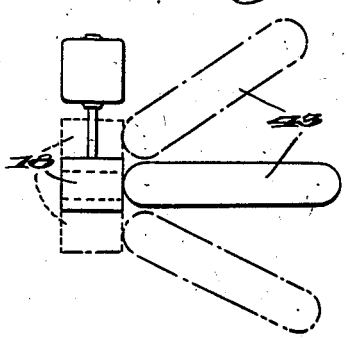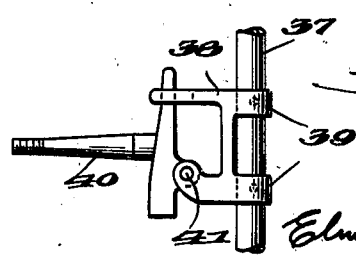

Patented May 12, 1942

2,283,005

UNITED STATES PATENT OFFICE 2,283,005

TIRE TREAD REMOVING MACHINE

Elmore Mynick Godfrey, Jr., Knoxville, Tenn.

Application January 30, 1939, Serial No. 253,716

12 Claims. (Cl. 29—76)

This invention relates to an improvement in tire tread removing machines designed for removing the worn tread from a used motor vehicle tire in order that a new tread may be placed thereon.

The object of this invention is to simplify and improve the construction of a machine of this character to enable it to be manufactured inexpensively and as simply as possible, and for adjustment to different positions to remove different lateral portions of the tread.

My improved machine has for additional objects the removal of the tread within full view of the operator during the cutting operation at all times, so that the operator may determine the degree of cut; and performs the cutting operation in as clean a manner as possible, directing the cuttings down and away from the operator so they are not thrown toward him and there is no injury or damage to the operator. The tire is driven separately from the grinder and rotates away from the grinder which doubles the effective speed of operation, prevents the tire and grinder from heating appreciably and saves the grinder because it operates in a cooler condition.

Provision is made for bodily adjusting the tire to different angular positions relative to the grinder and for separate rotation of the tire by power, so that it may be easily adjusted without conflict with the grinder. At the same time, provision is made for adjusting the grinder bodily toward and from the tire and transversely relative thereto.

These objects are carried out in a preferred embodiment of the invention which is illustrated in the accompanying drawings in which:

Fig. 1 is a side elevation of the machine embodying this invention;

Fig. 2 is a horizontal sectional view therethrough, substantially on the line 2—2 of Fig. 1;

Fig. 3 is a front elevation of the machine partly in section;

Fig. 4 is a detailed side elevation of the wheel axle mounting; and

Fig. 5 is a diagrammatic plan view of the cutter and tire in different adjusted positions.

Referring to Figs. 1 and 3, the machine utilizes a table designated generally by the numeral 1 supported at opposite ends on legs 2. The table 1 and legs 2 are preferably formed as castings securely fastened together to provide rigidity of construction with a minimum of weight and material. Intermediate the length of the table 1 is a third leg 3 which is secured thereto and extends downwardly therefrom, with a forwardly directed portion 4, to the underside of which is secured a foot 5 that securely braces the table, and forms a support, as will be explained hereafter.

As shown particularly in Fig. 3, the table 1 carries transversely extending guides 6 secured thereto, upon which rest longitudinal guides 7, capable of sliding movement transversely on the guides 6 but secured against relative endwise movement thereon by transverse bars 8 which are attached to the undersides of the longitudinal guides 7, in positions to coact with the transverse guides 6 for directing the lateral sliding movement of the guides 7 thereon.

Supported upon the longitudinal guides 7 is a supporting plate 9, capable of longitudinal sliding movement relative to the guides 7, having a slide 10 secured to the underside of said plate 9 and received between the longitudinal guides 7 for guiding said plate 9 longitudinally relative to the guides 7. To provide for this longitudinal adjustment of this supporting plate 9, one of the guides 7 has an arm 11, extending longitudinally therefrom, to the outer end of which is secured an upwardly extending lever 12 pivoted thereto at 13. A link 14 is pivoted at one end to the lever 12 and at the opposite end said lever 14 is pivotally connected with a bracket 15 secured to the supporting plate 9. Thus swinging movement of the lever 12 will cause sliding movement of the supporting plate 9 longitudinally relative to the guides 7.

Supported upon the supporting plate 9 is an electric motor 16, having its armature shaft 17 carrying a grinding member 18 thereon in a position over the supporting plate and arranged with the axis thereof extending parallel with the length of said plate. This grinding wheel 18 is shown as of the rasp type having radial spikes therein for the purpose of grinding off the peripheral surface of the tire that may be presented thereto. However, any other desired form of buffer or grinder may be used in place of the rasp shown that will perform the desired function, such for instance as an emery wheel, sand wheel, etc. The grinder 18 operates in a casing 19 also mounted upon the supporting plate 9 and carried thereby. It will be apparent that the longitudinal adjustment of the supporting plate 9 as described above, will move the grinding element longitudinally of its axis or transversely of the tire presented thereto, as hereinafter described.

For adjusting the grinding element toward and from its cutting position, provision is made for adjustment of the longitudinal guides 7 transversely along the guide 6. This is accomplished by a transverse screw 20 extending through internally threaded brackets 21 secured to the undersides of the guides 7, so that rotation of the screw relative thereto will move said brackets 21 and the guides 7 lengthwise relative to the screw and relative to the guides 6, thereby moving the grinding element 18 toward and from its cutting position, as will be apparent from Fig. 1. One end of the screw 20 is journaled in a bracket 22 secured to the back side of the table 1, while the opposite end of said screw is journaled in an arm 23 secured to the forward side of said table. A hand wheel 24 is secured to the screw 20 at its forward end for rotating said screw to accomplish the adjustment mentioned.

For mounting the tire in its proper position relative to the grinding element and for adjustment relative thereto, a bifurcated arm is designated generally by the numeral 25 and has its spaced portions embracing the rearwardly projecting part 4 of the intermediate leg 3, to which said bifurcated arm 25 is pivotally connected at 26, and extends forwardly over the foot 5 for swinging movement about the pivot 26 relative to said foot. The arm 25 has a wheel 27 journaled at the rearward end thereof and carrying a portion of the weight of the arm to relieve the pivot pin of its strain.

At its forward end, the bifurcated arm 25 carries a segment 28, the periphery of which has a series of spaced openings 29 in position to be engaged by a pin 30, slidable through the intermediate leg 3 as shown in Figs. 1 and 2, and which pin 30 normally is pressed rearward toward the segment by an expansion spring 31 which is interposed between one wall of the leg 3 and an abutment on the pin. The forward end of the pin 30 has an abutment 32, as may be formed by a nut thereon behind which is engaged a bifurcated upper end of a lever 33, pivoted intermediate its ends at 34 to the forward face of the intermediate leg 3 for forward swinging movement relative thereto, as may be caused by a foot treadle 35 at the lower end of said lever. Thus when the treadle 35 is depressed, the upper end of the lever 33 swings outward, withdrawing the pin 30 from its engagement in an opening 29, and allowing a transverse swinging movement of the pivoted arm 25 to an adjusted position, after which release of the lever 33 allows the spring 31 to force the pin into another opening 29 in the segment 28 to lock the segment in its adjusted position. At its rear end, the bifurcated arm 25 carries a pair of spaced clamps 36 within which is secured an upright post 37 for supporting the tire. Near its upper end, the post 37 has an angular bracket 38 secured thereto by clamps 39 (Fig. 4). The bracket 38 carries a stub axle 40 which is pivoted thereto at 41 with an upstanding projection received within a slot formed in the bracket to provide for slight swinging movement of the axle in its supported position.

The axle 40 has journaled thereon for free turning movement a hub 41 having the usual demountable wheel 42 mounted thereon for carrying the tire 43.

For rotating the wheel and tire thereon, a pulley 44 is secured to the inner side of the hub 41, which pulley is shown as receiving a V belt 45 extending over a similar pulley 46 connected with speed reducing worm gearing designated generally by the numeral 47 and driven from an electric motor 48. The speed reducing gearing 47 and motor 48 are mounted upon a platform 49 secured to the upper end of the post 37. The motor 48 has a cable 50 extending therefrom to the table 1, thence to the source of electrical supply which also drives the electric motor 16.

Secured to the upper end of the post 37 is an arm 51 that extends therefrom forwardly over the machine to a point within convenient reach of the operator so that he may swing the post around during the grinding operation and change the position of the tire 43 relative to the grinding element 18.

It will be apparent that in operation, the tire and grinding element will be operated at different peripheral speeds, the grinding element operating substantially at the speed of the electric motor, while the speed reducing gearing reduces the speed of the tire to approximately 4 R. P. M. preferably. This gives the maximum efficiency in removing the tread from the tire. The tire is turned in a direction away from the grinding element 18, as indicated by the arrows in Fig. 1 which increases the effective speed of each upon the other and prevents any appreciable heating of the tire or grinder.

By having the tire rotated separately from the grinder, this eliminates the necessity for interconnection and facilitates easy and simple adjustment of the position of the tire relative to the grinder. It also directs the cuttings downward, away from the operator, a pan 52 being provided to receive the cuttings, and shown as secured to the back side of the intermediate leg 3. This provides for substantially clean operation and gives the operator a full view of the tire as its tread portion is removed.

It will be apparent that the tire and its grinding element may be adjusted to different angular positions substantially as illustrated in Fig. 5, where they are shown in full lines in an intermediate position and in dotted lines in laterally adjusted positions which adjustments can be accomplished readily by the operator, as the cutting operation progresses, so as to remove substantially all of the desired periphery of the tire either at the extreme periphery or at the edges or both, in a simple and effective manner.

I claim:

1. In a tire tread removing machine, the combination of a support, means mounted on said support for removing a portion of a tire tread, a standard, means connected with the lower end of said standard for mounting said standard for bodily swinging movement about an upwardly extending axis relative to the support, means connected with the upper end portion of said standard above the standard mounting means for mounting a tire on said standard for turning movement about an approximately horizontal axis, and an arm rigidly connected with the standard beside the tire and extending laterally therefrom a substantial distance outside the periphery of the tire to clear the tire on said mounting means and providing a handle for turning the same relative to the tread removing means.

2. In a tire tread removing machine, the combination of a support, a rotary grinder mounted on said support, a standard, means connected with the lower end of said standard for mounting said standard for bodily swinging movement relative to the support about an upwardly extending axis, means connected with the upper end portion of said standard above the standard mounting means for mounting a tire on the standard for turning movement about an approximately horizontal axis to present the periphery of the tire to the grinder to remove a portion therefrom, and an arm rigidly connected with the standard beside the tire and extending laterally therefrom a substantial distance outside the periphery of the tire to clear the tire on said mounting means and providing a handle for turning the same relative to the tread removing means.

3. In a tire tread removing machine, the combination of a table, means for removing a portion of a tread and mounted on the table, a leg for the table having a forwardly directed portion, a link pivoted to said leg for lateral swinging movement relative to the forwardly directed portion, tire supporting means carried by said link for presenting a tire to the tread removing means, a segment secured to the link for swinging movement therewith, locking means operatively connected with the leg for engaging the segment to hold the tire supporting means in an adjusted position, and an arm secured to the tire supporting means and projecting forwardly over the table for manual adjustment of said supporting means.

4. In a tire tread removing machine, the combination of a table, means for removing a portion of a tread and mounted on the table, a leg for the table having a forwardly directed portion, a link pivoted to said leg for lateral swinging movement relative to the forwardly directed portion, tire supporting means carried by said link for presenting a tire to the tread removing means, said leg having a supporting foot underlying the forwardly directed portion and link, said link having a bifurcated end embracing the forwardly directed portion at the pivot, a segment secured to the link for turning movement therewith, and a spring-pressed pin slidable relative to the leg for engaging the segment to lock the same in a set position and hold the tire supporting means against swinging movement.

5. In a tire tread removing machine, the combination of a flat table, supporting means for said table, means for removing a portion of a tread overlying and mounted upon the upper surface of the table, a leg extending downwardly from the table supported thereby having a forwardly directed portion, a link pivoted to said leg for lateral swinging movement relative to the forwardly directed portion, tire supporting means carried by said link for presenting a tire to the tread removing means, and a roller secured to the free end portion of said link in position to support a part of the weight of the tire supporting means and to relieve the link pivot of strain.

6. In a tire tread removing machine, the combination of a support, means mounted on the support for removing a portion of a tread, tire supporting means rearwardly of said support in position to present a tire to the tread removing means, means for pivotally mounting said tire supporting means for swinging movement relative to the tread removing means, and an arm secured to the tire supporting means and extending forwardly relative to the support to a position adjacent the front thereof for manual adjustment of the tire supporting means.

7. In a tire tread removing machine, the combination of a table, means mounted on the table for removing a portion of tread, tire supporting means extending rearwardly from said table in position to present a tire to the tread removing means, means for pivotally mounting said tire supporting means for swinging movement relative to the tread removing means, and an arm secured to the tire supporting means and extending forwardly over the table to a position adjacent the front thereof for manual adjustment of the tire supporting means.

8. In a tire tread removing machine, the combination of a support, means mounted on the support for removing a portion of a tread, tire supporting means including means for engaging peripherally the inner side of the tire rearwardly of said support in position to present a tire to the tread removing means, means for pivotally mounting said tire supporting means for swinging movement relative to the tread removing means, and an arm rigidly secured to the tire supporting means and extending laterally relative thereto to a point appreciably outside said peripheral engaging means and a tire mounted thereon for manual adjustment of the tire supporting means.

9. In a tire tread removing machine, the combination of an upstanding support, a rotary grinder mounted on the upper portion of the support, an arm extending laterally from the lower portion of the support, said arm being pivoted at one end to the support for free swinging movement relative thereto, an upright standard having the lower end thereof mounted on the opposite end of said arm and upstanding therefrom beside the support, a structure secured to the upper end portion of said standard and carrying a journal having means for supporting a tire thereon, and a driving motor mounted on the upper end portion of the standard and having a driving connection with said tire supporting means.

10. In a tire tread removing machine, the combination of an upstanding support, a rotary grinder mounted on the upper portion of the support, an arm extending laterally from the lower portion of the support, said arm being pivoted at one end to the support for free swinging movement relative thereto, an upright standard having the lower end thereof mounted on the opposite end of said arm and upstanding therefrom beside the support, a structure secured to the upper end portion of said standard and carrying a journal for supporting a tire thereon, a driving motor mounted on the upper end portion of the standard, and gearing for connecting said motor with the tire to form a driving connection therebetween.

11. In a tire tread removing machine, the combination of an upstanding stationary support, a rotary grinder mounted on the upper portion of said support, an upright standard adjacent said support, means mounting said standard for movement toward and from said support, a structure secured to the upper end portion of said standard and including a journal having means for rotatably supporting a tire thereon, and a driving motor mounted on the upper end portion of said standard, and having a driving connection with said tire supporting means.

12. In a tire tread removing machine, the combination of an upstanding stationary support, a rotary grinder mounted on the upper portion of said support, an upright standard adjacent said support, means mounting said standard for movement toward and from said support, a structure secured to the upper end portion of said standard and including a journal having means for rotatably supporting a tire thereon, a driving motor mounted on the upper end portion of said standard, and gearing connecting said motor with the tire supporting means for forming a driving connection therebetween.

ELMORE MYNICK GODFREY, Jr.

CERTIFICATE OF CORRECTION.

Patent No. 2,283,005. May 12, 1942.

ELMORE MYRICK GODFREY, JR.

It is hereby certified that the name of the inventor in the above numbered patent was erroneously described and specified as "Elmore Mynick Godfrey, Jr." whereas said name should have been described and specified as --Elmore Myrick Godfrey, Jr.--, as shown by the records of this office; and that the said Letters Patent should be read with this correction therein that the same may conform to the record of the case in the Patent Office.

Signed and sealed this 9th day of March, A. D. 1943.

(Seal)

Henry Van Arsdale,
Acting Commissioner of Patents.